United States Patent
Gerstel et al.

(10) Patent No.: US 8,463,127 B2
(45) Date of Patent: Jun. 11, 2013

(54) OPTICAL SWITCHING ARCHITECTURES FOR NODES IN WDM MESH AND RING NETWORKS

(75) Inventors: Ornan Gerstel, Los Altos, CA (US); Mauro Macchi, Varese (IT); Stefano Piciaccia, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/208,870

(22) Filed: Aug. 12, 2011

(65) Prior Publication Data

US 2011/0299850 A1 Dec. 8, 2011

Related U.S. Application Data

(62) Division of application No. 11/278,595, filed on Apr. 4, 2006, now Pat. No. 8,023,825.

(51) Int. Cl.
 *H04J 14/02* (2006.01)
 *H04J 14/00* (2006.01)
(52) U.S. Cl.
 USPC ........... 398/83; 398/48; 398/49; 398/50; 398/51
(58) Field of Classification Search
 USPC .............................. 398/83, 48–51
 See application file for complete search history.

(56) References Cited

U.S. PATENT DOCUMENTS

| | | | |
|---|---|---|---|
| 6,414,767 B1 | 7/2002 | Blair et al. | |
| 6,525,852 B1 | 2/2003 | Egnell | |
| 7,286,760 B1 | 10/2007 | Lam et al. | |
| 2002/0197000 A1 | 12/2002 | Marom | |
| 2004/0005113 A1 | 1/2004 | Noonan | |
| 2004/0190901 A1 | 9/2004 | Fang | |
| 2005/0031349 A1 | 2/2005 | Park et al. | |
| 2005/0265721 A1 | 12/2005 | Pigeon | |
| 2006/0034610 A1 | 2/2006 | Akiyama et al. | |
| 2007/0160372 A1 | 7/2007 | Eberlein et al. | |
| 2007/0258715 A1 | 11/2007 | Androni et al. | |
| 2009/0041457 A1* | 2/2009 | Maki et al. | 398/45 |

FOREIGN PATENT DOCUMENTS

| | | |
|---|---|---|
| EP | 1017242 A1 | 7/2000 |
| EP | 1213944 A2 | 6/2002 |

OTHER PUBLICATIONS

International Preliminary Report and Written Opinion dated Oct. 12, 2007; corresponding to PCT/US2007/065007.

* cited by examiner

*Primary Examiner* — Kenneth N Vanderpuye
*Assistant Examiner* — Daniel Dobson
(74) *Attorney, Agent, or Firm* — Edell, Shapiro & Finnan, LLC

(57) ABSTRACT

Switching architectures for WDM mesh and ring network nodes are presented. In mesh networks, the switching architectures have multiple levels—a network level having wavelength routers for add, drop and pass-through functions, an intermediate level having device units which handle add and drop signals, and a local level having port units for receiving signals dropped from the network and transmitting signals to be added to the network. The intermediate level device units are selected and arranged for performance and cost considerations. The multilevel architecture also permits the design of reconfigurable optical add/drop multiplexers for ring network nodes, the easy expansion of ring networks into mesh networks, and the accommodation of protection mechanisms in ring networks.

5 Claims, 8 Drawing Sheets

OPTICAL SWITCHING ARCHITECTURES FOR NODES IN WDM MESH AND RING NETWORKS

CROSS REFERENCE TO RELATED APPLICATIONS

This application is a divisional of U.S. patent application Ser. No. 11/278,595 filed Apr. 4, 2006, entitled "Optical Switching Architectures for Nodes in WDM Mesh and Ring Networks," the entire contents of which are hereby incorporated by reference.

BACKGROUND

The present invention is related to WDM (Wavelength Division Multiplexing) optical systems and, more particularly, to switching architectures of nodes for handling optical channels in WDM network systems.

WDM refers to network systems in which multiple optical signals having different wavelengths can share an optical fiber, each wavelength defining a particular communication channel. In a stricter sense, WDM also refers to an ITU (International Telecommunications Union) standard which includes the specification of the particular channel wavelengths and the spacings between these channels. DWDM (Dense WDM) refers to a more recent ITU standard in which the channel spacings are tighter so that more wavelength channels can be packed into an optical fiber. It should be noted that the term WDM, as used herein, refers to the first, more inclusive sense so as to include the ITU WDM and DWDM standards, unless specifically stated otherwise.

WDM has many advantages for optical communication systems including increased capacity. A representative WDM network may include many nodes connected to one another by optical fibers in a mesh or in a ring arrangement. At each node typically, only a portion of the wavelengths (also referred to as WDM channels) are used for transmission and reception, while the other wavelengths remain untouched as "pass-through" channels. For reception, a node isolates and removes (or "drops") these particular channel signals from the light flow in an optical fiber for processing by receiver circuitry within the node or for otherwise rerouting the signals; for transmission, the node generates or routes (or "adds") particular channel signals generated elsewhere into the light flow in an optical fiber for transmission to designated destinations over the network. Besides these add and drop functions, many nodes have switching functions by which signals in one channel carried in one optical fiber are switched to a different fiber, by which signals in one wavelength channel are switched to a different wavelength channel, or by which signals in a wavelength channel are switched to a different optical fiber in a different wavelength channel.

Heretofore, switching architectures for such nodes have been directed toward achieving full functionality with resulting high costs. This has impeded the adoption of optical networks and the advantages of large bandwidth in telecommunication networks. Alternatively, some switching architectures with low costs have been advocated, but with limited functions and utility.

Based upon newly emerging technologies, the present invention provides for switching architectures for nodes in which different functional levels are separated by interfaces. This allows each level to be constructed and treated as a module. This construction allows node repairs to be made easily. Furthermore, the node can be upgraded easily and systematically with sufficient functionalities to provide the desired utility to the user, i.e., the node has the desired functions on an "as-needed" basis. Costs are contained to encourage the adoption of optical networks.

DETAILED DESCRIPTION

Figure 1A:
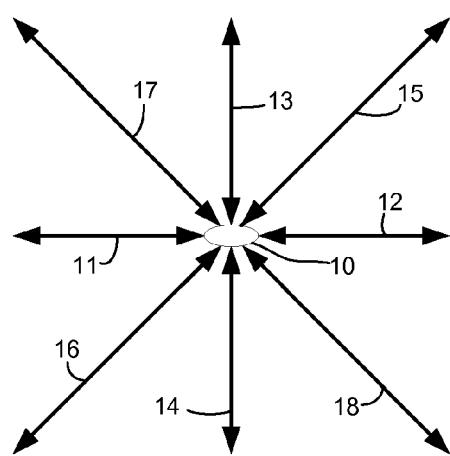
FIG. 1A illustrates a general switching architecture for nodes in a mesh optical network, according to one embodiment of the present invention.
Figure 1B:
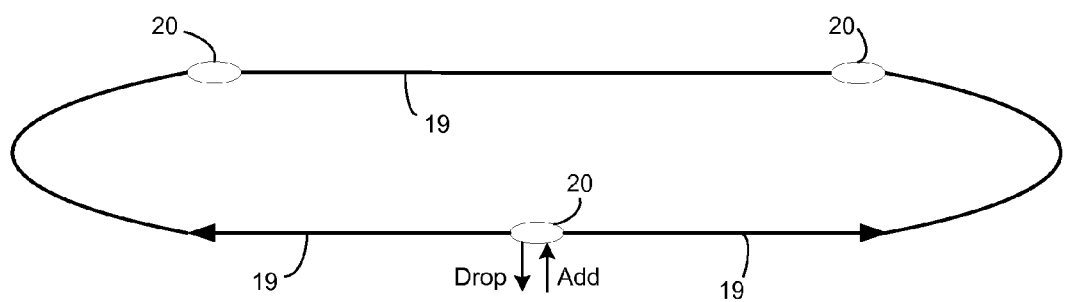
FIG. 1B illustrates a general switching architecture for nodes in a ring network.

FIGS. 1A and 1B illustrate nodes in mesh and ring networks respectively. In a mesh, a single representative node 10 in FIG. 1A is connected by optical fibers which carry optical signals to and from the node in a plurality of directions to other nodes of the network. The double-headed arrows 11-18 represent at least two optical fibers, one optical fiber to carry signals in each direction. The arrow 11 illustrates optical signals to, and from, the node 10 from, and to, the "west" direction. The arrow 12 illustrates optical signals to, and from, the node 10 from, and to, the "east" direction. Signals to and from the "north" directions are indicated by an arrow 13 and signals to and from the "south" directions are indicated by an arrow 14. The arrows 15-18 indicate signals in the "northeast," "southwest," "northwest," and "southeast" directions respectively, and also are representative of a generalized mesh in which signal directions are not limited to north/south, east/west directions.

On the other hand, a ring network can be considered a degenerate case of a mesh network in which the plurality of signal directions to and from a node is reduced to only two directions. Representative nodes 20 in FIG. 1B are connected by optical fibers which carry optical signals in "west" and "east" directions to other nodes (not shown) in a ring, i.e., a closed loop 19. Arrows show that ring 19 has at least two optical fibers, each optical fiber carrying signals in opposite directions around the ring.

According to the present invention, the devices in these mesh and ring nodes are organized into levels with interfaces between the levels. Each level is modularized so that the repair of a node can be made easily. Furthermore, to meet the desired functional capabilities a node can be easily and economically up-graded (or down-graded) by replacing selected modules, rather than replacing the entire node.

In the architecture of the present invention, a node is divided into at least two levels or, more likely, three levels. In a three-level architecture, the node is divided into a first (or network) node, a second (or intermediate) node, and a third (or local) level. In a two-level architecture, the devices and functions of the intermediate level are split between the network and local levels. The different levels of the node architecture of the present invention are explained and described below in detail: first, with respect to three level architectures in mesh networks; secondly, with respect to two-level architectures in mesh networks; thirdly, with respect to three-level architectures in ring networks; and finally, with respect to two-level architectures in ring networks.

Organization of Three-Level Architectures for Mesh Network Nodes

Figure 2:
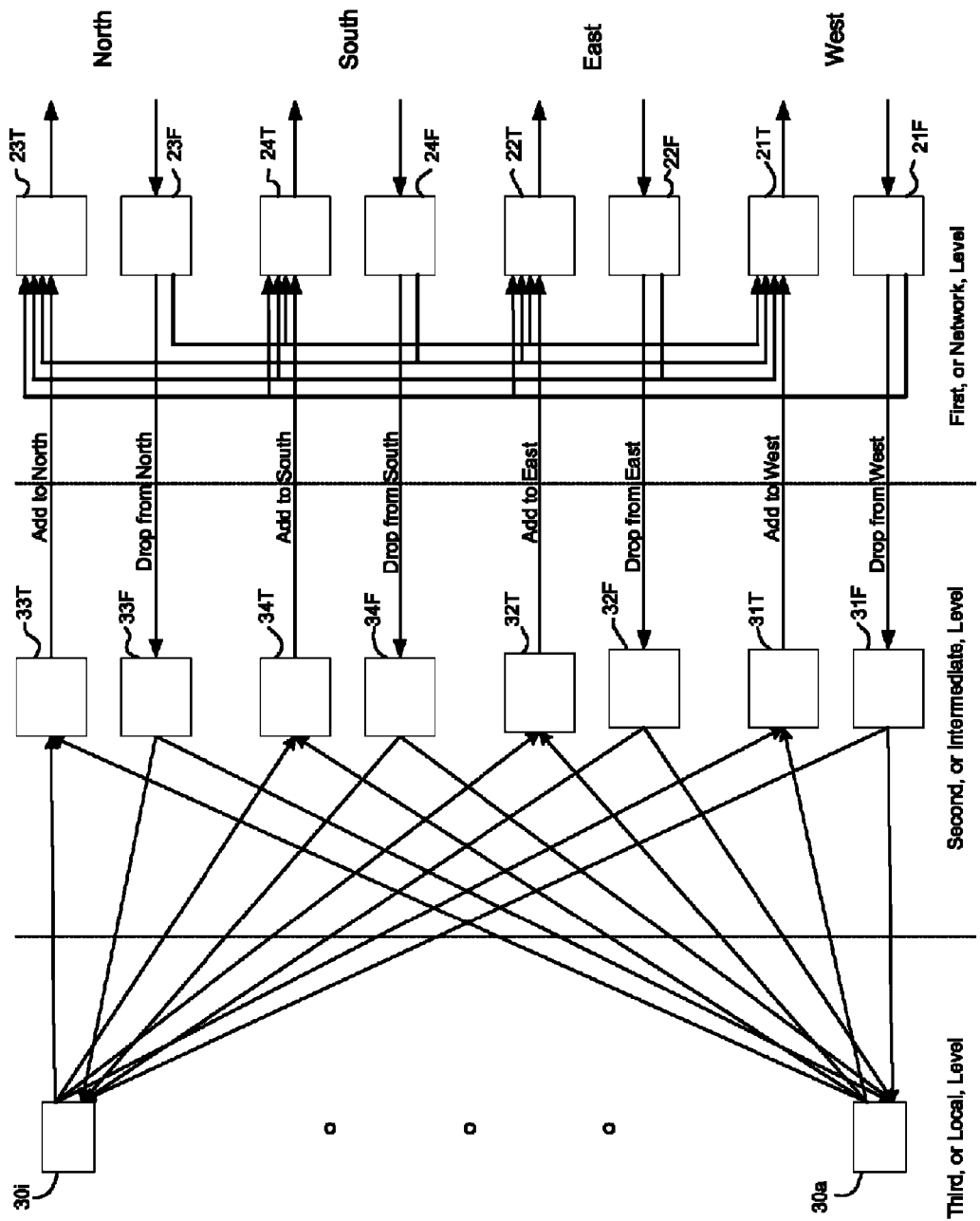
FIG. 2 illustrates a switching architecture for nodes in a mesh optical network, according to one embodiment of the present invention.

A node switching architecture for a mesh network is shown in FIG. 2. In accordance with the present invention, the architecture is organized in three levels as separated by the two vertical dotted lines.

At a first, or network, level, wavelength routers 21T-24T and 21F-24F selectively direct the movement of WDM optical signals through the network node, i.e., the node "pass-through" signals. The wavelength routers 21T-24T and 21F-24F also selectively add local signals to, and selectively drop network signals from, the network. The signals to be added and dropped are received from, and sent to, device units 31T-34T and 31F-34F in a second, or intermediate, level of the switching architecture. The device units 31T-34T and 31F-34F in turn receive the signals to be added from, or send the signals to be dropped to, port units 30a-30i in a third, or local, level of the switching architecture.

Returning to the network level of the switching architecture, the optical fibers of the network are shown as running in only four "directions," north, south, east and west for simplicity's sake. It should be understood that more directions in the mesh are possible. The wavelength routers 21T and 21F handle signals to and from the west direction. The wavelength router 21T sends signals to (T) the west; the wavelength router 21F receives signals from (F) the west. Likewise, the wavelength routers 22T and 22F handle signals to and from the east direction; the wavelength routers 23T and 23F handle signals to and from the north direction; and the wavelength routers 24T and 24F handle signals to and from the south direction.

The wavelength router 21T selectively adds local signals to the west direction; the wavelength router 22T selectively adds local signals to the east direction; the wavelength router 23T selectively adds local signals to the north direction; and the wavelength router 24T selectively adds local signals to the south direction. On the other hand, the wavelength router 21F selectively drops signals from the west direction; the wavelength router 22F selectively drops signals from the east direction; the wavelength router 23F selectively drops signals from the north direction; and the wavelength router 24F selectively drops signals from the south direction.

The signals to be added are sent from the device units 31T-34T and the dropped signals are received by the device units 31F-34F in the second, or intermediate, level of the switching architecture node. As described in further detail below, the device units 31T-34T and 31F-34F are created from different device components and arranged in different combinations of device components to meet the desired performance and costs target for the node.

The port units 30a-30i form the third, or local, level of the switching architecture for the signals dropped from the network or the local signals to be added to the network transport. Since the number of port units depends upon the particular devices or arrangement of devices which form the device units of the intermediate layer, FIG. 2 shows an indeterminate number of port units 30a-30i. Each port unit 30a-30i includes a transmitter which converts local electrical signals into optical signals for network transmission and receivers which convert optical signals dropped from the network into electrical signals.

Figure 3A:
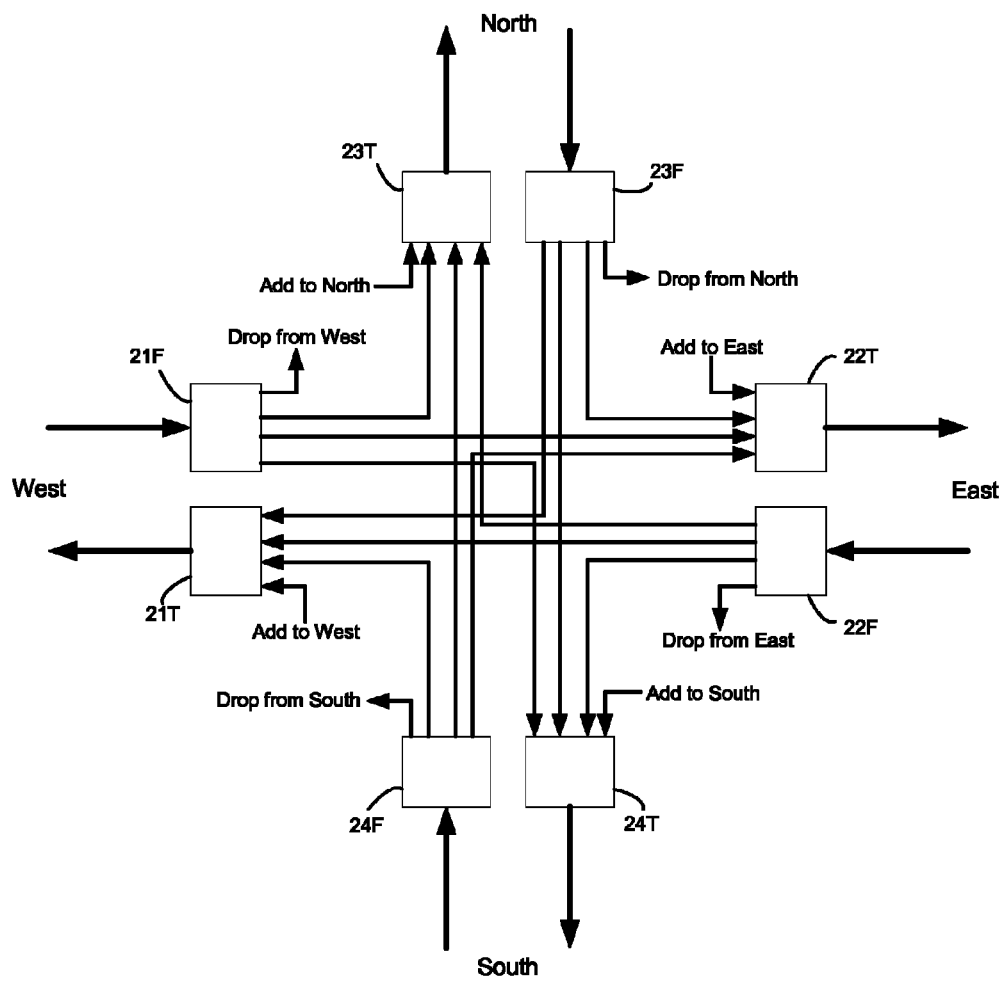
FIG. 3A illustrates the first level of the node switching architecture of FIG. 2 in greater detail.
Figure 3B:
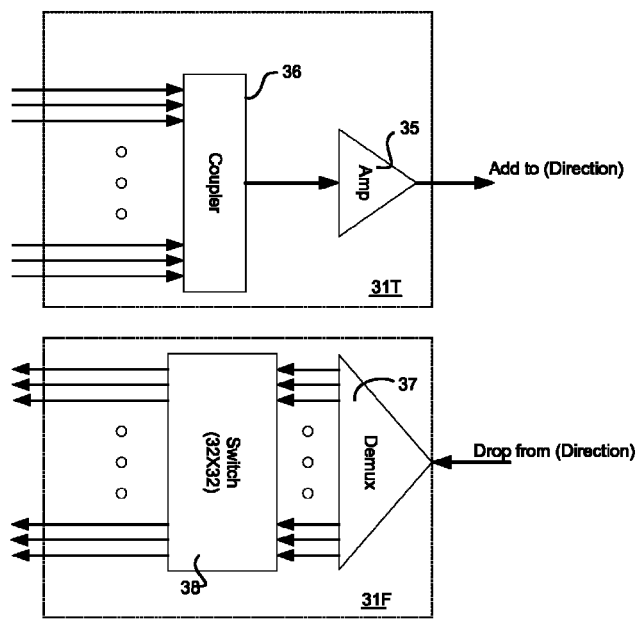
FIG. 3B illustrates an embodiment of the second, or intermediate, level of the node switching architecture of FIG. 2 in greater detail.
Figure 3C:
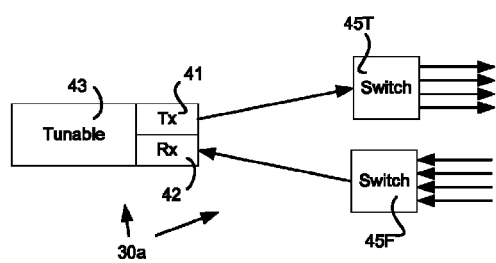
FIG. 3C illustrates the third level of the node switching architecture of FIG. 2 in greater detail.

FIGS. 3A-3C illustrate the details of the three-levels of the switch architecture of FIG. 2, according to one embodiment of the present invention. FIG. 3A shows the first network level of the node switch architecture. Each network direction is handled by two wavelength routers, a "T," or "to," wavelength router, which directs WDM optical signals to the particular direction, and an "F," or "from," wavelength router, which accepts signals from the particular direction. The T wavelength router of each direction is connected to the outputs of the F wavelength routers of the other three directions. For example, the wavelength router 23T, which sends signals to the north direction from the node, receives signals from the west wavelength router 21F, the east wavelength router 22F and the south wavelength router 24F. The F wavelength router of each direction is connected to inputs of the T wavelength routers of the other three directions. For example, the wavelength router 22F, which receives signals from the east direction, sends signals to the west wavelength router 21T, the north wavelength router 23T, and the south wavelength router 24T.

For the add and drop functions, the T wavelength router to each direction also receives Add input signals from the intermediate layer and the F wavelength router from each direction also sends Drop signals to the intermediate layer. In the intermediate stage, the device units 31T-34T manage the signals which are to be added to the network in the west, east, north and south directions respectively. The device units 31F-34F manage the WDM signals which are to dropped from the network from the west, east, north and south directions respectively.

The details of one embodiment of the device units 31T and 31F for west direction signals are shown in FIG. 3B and are representative of the device units 32T-34T and 32F-34F for the other network directions. The device unit 31T is formed from a coupler 36 and an amplifier 35. The coupler 36 is connected to, and receives signals from, the third, or local, level and combines these signals into a single fiber which is an input to the amplifier 35. The coupler 36 has input terminals to receive signals for all the wavelength channels which may be carried on a network optical fiber. Currently WDM networks carry 32 wavelength channels. After being amplified by the amplifier 35, the combined signals are sent to the west direction wavelength router 21T of the first level.

The device unit 31F is formed by a demultiplexer 37 and a switch 38. The demultiplexer 37 is connected to, and receives signals from, the first level west wavelength router 21F. The demultiplexer 37 separates the signals which are dropped by the wavelength router 21F into wavelength channel signals which are passed to input terminals of the switch 38. The switch 38 has a 32×32 switching capacity with the assumption that an optical fiber can carry up to 32 wavelength channels so that the switch 38 can selectively place any wavelength channel at any of the switch's output terminals (and ports).

A port unit 30a, which is representative of all the ports 30a-30i of the third, or local, level is shown in FIG. 3C. (Note that with the 32×32 switch 38, the total number of port units 30a-30i can equal 32.) For sending signals to the intermediate level, the port unit 30a has a transmitter 41 with a tunable laser 43 and a 1×N switch 45T. The transmitter 41 receives electrical signals and converts them to optical signals by the laser 43 which is set to a particular wavelength channel for the port unit 30a. The output of the transmitter 41 is sent to the switch 45T which in turn is set to pass the transmitter signals to one of its N output terminals. N is typically equal to the number of outgoing directions from the network node, four, in this example so that the switch 45T is connected to the intermediate level device units 31T-34T for the east, west, north and south directions. The transmitted signals from the port unit 30a can be placed in any wavelength channel by the tunable laser 43 and sent in any direction by the switch 45T.

For signals received from the intermediate level, the port unit 30a has an N×1 switch 45F and a receiver 42. The switch 45F is connected to the intermediate level device units 31F-34F for the east, west, north and south directions. With each of the device units 31F-34F having a 32×32 switch 38 as shown in FIG. 3B, the port receiver 42 can selectively receive network signals dropped from any one of the network directions, or more precisely, the port receiver of any one of the ports unit 30a-30i can receive network signals dropped from any one of the network directions.

Thus the node switch architecture illustrated in FIGS. 3A-3C is highly flexible. By setting the tunable lasers 43 in the local port units 30a-30i, the switches 38 in the intermediate device units 31F-34F and the wavelength routers 21F-24F of the first level, any local port unit 30a-30i can send signals on any wavelength channel in any network direction. Likewise, by setting the switches 38 in the device units 31F-34F and the switch 45F of a port unit 30a-30i, any local port unit can receive signals on any wavelength channel from any network direction. Control of the tunable laser 43, switches 45T and 45F and switch 38 can be set manually or by computer programming by a control unit (not shown) with control lines to these elements.

Most of the device components described above are readily available and well-known to optical network designers and engineers. The wavelength routers used in the network level are devices which can direct signals received at any input port to any output port by wavelength. Thus the wavelength routers 21T-24T and 21F-24F can manage the pass-through and add/drop functions for the node. Furthermore, optical performance is acceptable with pass-through internal losses (which include losses through two wavelength routers) around 8 dB. Wavelength routers are available from companies, such as Capella Photonics of San Jose, Calif., and Metconnex, Inc. of Ottawa, Ontario, Canada.

Since wavelength routers have a limited number of ports, typically around 10, the costs of such devices are relatively low in comparison to their switching responsibilities. On the other hand, switches with a large number of ports, such as the 32×32 switch 38 of FIG. 3B, are relatively expensive compared to the other components of the described architecture. MEMS (Micro-Electro-Mechanical Systems) technology is typically employed in such switches which allow for maximum functionality so that signals at any one of the numerous switch input ports can be sent to any one of the numerous output ports.

Figure 4:
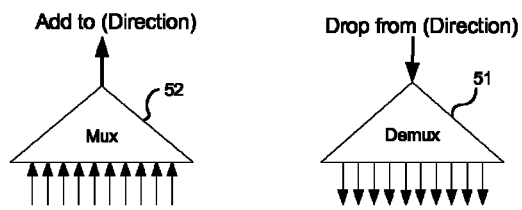
FIG. 4 illustrates multiplexers and demultiplexers used as components for the intermediate level of the node switching architecture, according to another embodiment of the present invention.

The present invention also offers less expensive alternatives to the previously described node switching architecture while maintaining much of its flexibility. In FIG. 4 a demultiplexer 51 is used for the representative device unit 31F and a multiplexer 52 for the representative device unit 31T in the intermediate level, according to another embodiment of the present invention. Each of the input ports of the multiplexer 52 is connected to the transmitter 41 and switch 45T of one of the local port units 30a-30i and the multiplexer's output port is connected to its corresponding first level wavelength router 21F. Likewise, each of the output ports of the demultiplexer 51 is connected to the switch 45F and receiver 42 of the corresponding local port unit 30a-30i, and the demultiplexer's input port is connected to its corresponding first level wavelength router 21T. Of course, this combination of components for the intermediate level device units 31T-34T and 31F-34F is not as flexible as the combination of components illustrated in FIG. 3B. Unlike the output ports of the switch 38, the wavelength channels of the output terminals of the demultiplexer 51 cannot be changed. Furthermore, the number of output terminals is limited compared to the full number of channels on a fiber since the signal strength on each output terminal of a demultiplexer is correspondingly reduced by the number of output terminals. The number of port units 30a-30i must be reduced accordingly. Nonetheless, if the add/drop requirements for the node are not high, these intermediate level device units 31T-34T and 31F-34F provide satisfactory performance at a much lower cost than the device units represented in FIG. 3B.

Figure 5:
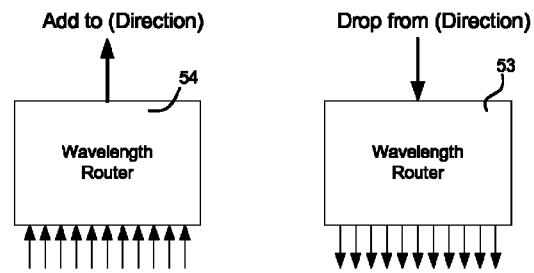
FIG. 5 illustrates wavelength routers used as components for the intermediate level of the node switching architecture, according to another embodiment of the present invention

In place of the intermediate level demultiplexer and multiplexer of FIG. 4, wavelength routers are used in FIG. 5, according to another embodiment of the present invention. A wavelength router 53 is used for the device unit 31F and a wavelength router 54 for the device unit 31T. Each of the input ports of the wavelength router 54 is connected to the transmitter 41 and switch 45T of one of the local port units 30a-30i and the wavelength router's output port is connected to an input port of its corresponding first level wavelength router 21F. Likewise, each of the output ports of the wavelength router 53 is connected to the switch 45F and receiver 42 of the corresponding local port 30a-30i and the wavelength router's input port is connected to an input port of its corresponding first level wavelength router 21T. While these intermediate level components are flexible so that the wavelength router 53 can selectively switch the wavelength channel of its output port and connected local port units 30a-30i, the number of output (or input) ports of a wavelength router is fairly limited. This sharply restricts the number of local port units 30a-30i. To increase the number of local port units, additional wavelength routers can be added on any available (unused) output ports of the first level wavelength router 21F and the input ports of the wavelength router 21T. This allows the number of port units for add/drop functions to be increased in a modular fashion, on an "as-needed" basis, so that costs are incurred when the system is expanded. Nonetheless, the wavelength routers of FIG. 5 are more expensive than the multiplexers and demultiplexers of FIG. 4.

Figure 6:
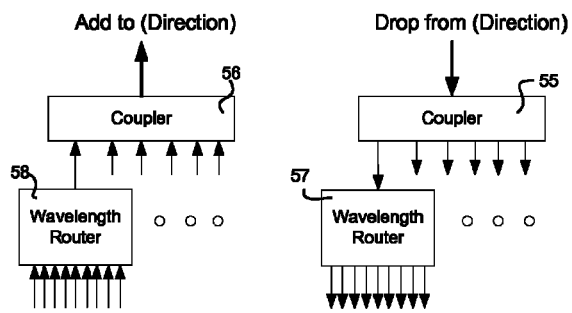
FIG. 6 illustrates couplers and wavelength routers used as components for the intermediate level of the node switching architecture, according to another embodiment of the present invention.

The addition of wavelength routers for expanding the number of port units 30a-30i can be seen in another embodiment of the present invention in FIG. 6. Combinations of couplers and wavelength routers are used for the intermediate level. A coupler 55 and one or more wavelength routers 57 are used for the device unit 31F, and a coupler 56 and one or more wavelength routers 58 for the device unit 31T. Each wavelength router 57 has an input port connected to an output port of the coupler 55 and its output ports connected to switch 45F and receiver 42 of a port unit 30a-30i. Each wavelength router 58 has an output port connected to an input port of the coupler 56 and its input ports connected to switch 45T and transmitter 41 of the corresponding port 30a-30i. As more ports units are needed, more wavelength router 57 and 58 are respectively connected to the output ports of the coupler 55 and the input ports of the coupler 56. Furthermore, the switches 45T for the port units 30a-30i can be replaced by cheaper couplers since the wavelength router(s) 58 can perform the functions of the switches 45T. While less expensive to implement than the FIG. 5 arrangement, the add/drop insertion losses of the FIG. 6 embodiment are greater due to the couplers 55 and 56 (and couplers substituting for the switches 45T in the port units 30a-30i). Hence optical performance for the add/drop functions is sacrificed for lower costs.

Figure 7:
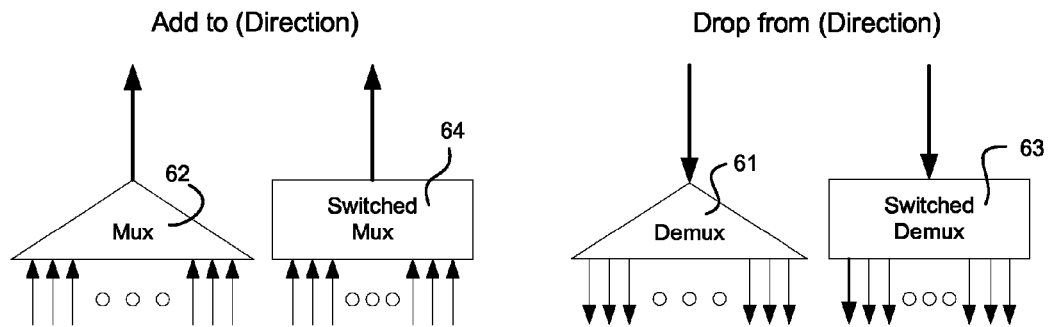
FIG. 7 illustrates an intermediate level with a multiplexer and a demultiplexer as shown in FIG. 4, plus a switched multiplexer and a switched demultiplexer for additional add/drop functionality, according to still another embodiment of the present invention.

Another embodiment of the present invention is illustrated in FIG. 7 which also permits the optional increase in the number of local add/drop port units 30a-30i. Like the arrangement in FIG. 4, a multiplexer 61 and demultiplexer 62 are arranged in the intermediate layer to connect local port units 30a-30i in the third layer. If more local port units are needed, the wavelength routers 21F-24F and 21T-24T in the first layer drop and add more wavelength channels through their unused output and input ports. In the intermediate layer a switched multiplexer 64 is connected to the newly operational input ports of the wavelength routers 21T-24T and a switched demultiplexer 63 is connected to the newly operational output ports of the wavelength routers 21F-24F. A switched demultiplexer is the demultiplexer/switch combination shown in FIG. 3B. A switched multiplexer is a combination of a switch with its output terminals connected to the input terminals of an optical multiplexer. Of course, the costs per channel through the switched multiplexer 64 and demultiplexer 63 are higher than those through multiplexer 61 and demultiplexer 62 and their fixed local port units. The switched multiplexer 64 and demultiplexer 63 can be used for higher value services, such as channels requiring optical protection.

Switching Architectures for Nodes in Ring Networks

The multi-level switching architecture of the present invention is further adaptable to ring networks, the degenerate case of a multi-directional mesh of optical fibers reduced to optical fibers carrying signals in two opposite directions. As a matter of terminology, it should be noted that combinations of device components which provide for the add, drop and pass-through functions of a node of a ring network are often called optical add/drop multiplexers (OADMs). OADMs which allow the added, dropped or passed-through wavelength channels to be changed are termed reconfigurable add/drop multiplexers (ROADMs). The present invention provides for tri-level architectures for ROADMs which are flexible in view of their costs, capable of expanding a ring network into mesh network, and suitable for network protection mechanisms.

Figure 8:
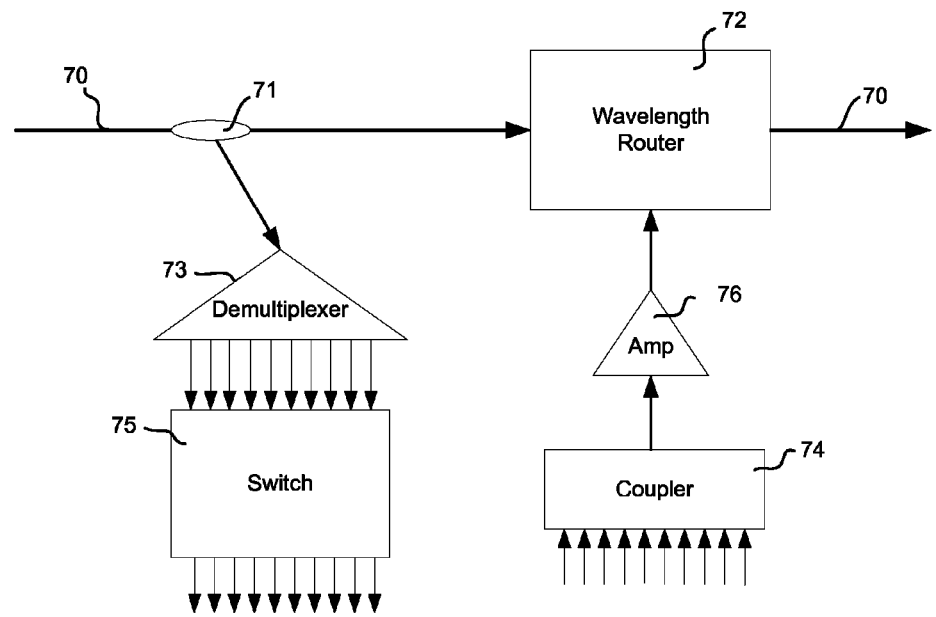
FIG. 8 shows an embodiment of the present invention for ring network nodes at which signals can be added and dropped.

A switching architecture for an ROADM, according to an embodiment of the present invention, is partially illustrated in FIG. 8 which shows only one ring optical fiber 70. Most ring networks, such as those running under SONET/SDH protocols, have at least a second optical fiber in which signals travel in the opposite direction from the first fiber. The FIG. 8 architecture includes a coupler 71, a demultiplexer 73 and a switch 75 for the drop function of the node, and a wavelength router 72, a coupler 74 and an amplifier 76 for the add function of the node. The coupler 71 and wavelength router 72 operate at the first level of architecture to manage the add, drop and pass-through operations for the optical signals on the ring network.

For the drop function, the coupler 71 splits the signals in the fiber and directs one set of signals to the wavelength router 72 and a second set of signals to the demultiplexer 73 and switch 75, which operate at the intermediate level of the architecture. The demultiplexer 73 separates the signals by their wavelengths and the 32×32 switch 75 selectively directs the wavelength signals to its output ports which in turn are connected to port units 30a-30i (shown in FIG. 3C) operating at the third, or local, level of the architecture. In the present embodiment, the switches 45T and 45F of the port units (see FIG. 3C) are 1×2 and 2×1 respectively and each switch 45F which is connected to the receiver 42 of the port unit has one of its two input ports connected to one of the output ports of the switch 75. The second input port of the switch 45F is connected to an output terminal of a corresponding switch 75 for the second network optical fiber (not shown) for carrying signals in the opposite direction.

The wavelength router 72 selects the wavelength signals from the coupler 71 which are to be passed-though the node. For the add function, the wavelength router 72 also selectively adds the amplified optical signals from the coupler 74 and the amplifier 76, which operate at the intermediate level of the architecture, to the optical fiber 70. Each of the input ports of the coupler 74 is connected to an output port of the switch 45T of the port elements 30a-30i which is also connected to the switch 75. The second output port of the switch 45T is connected to an input port of a coupler 74 for the second optical fiber (not shown).

The resulting ROADM has an expensive component, i.e., the switch 75. Nonetheless, signals through the switch 75 and the wavelength router 72 are controllable so that locations of wavelength channels can be moved about the add/drop port units 30a-30i and different wavelength channels selected for passing through the node.

Figure 9:
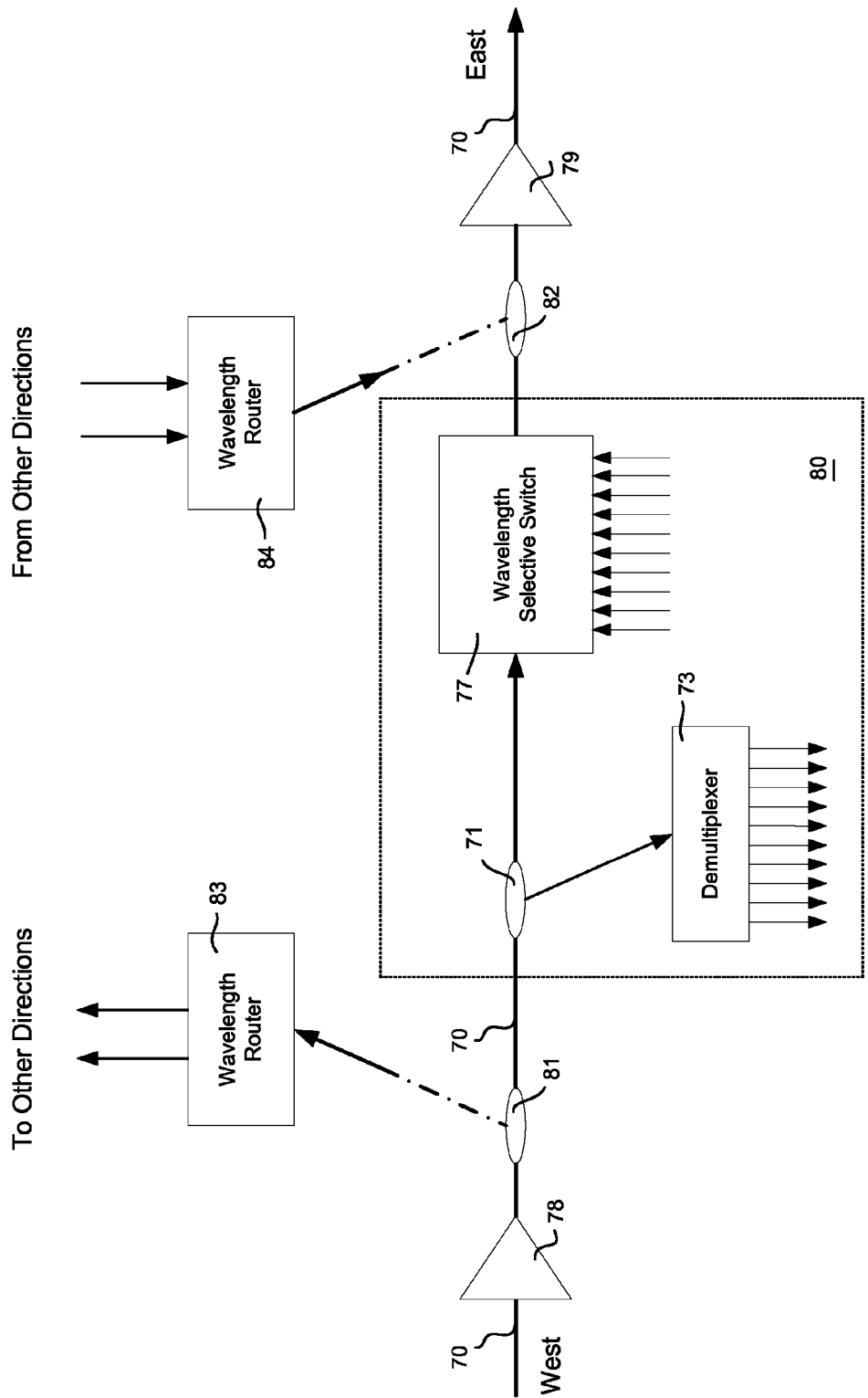
FIG. 9 shows another embodiment of the present invention for ring network nodes to be expanded.

The switching architecture of the present invention also provides for the ability to expand a ring network into a mesh network. In FIG. 9 the same optical fiber 70 carrying signals from the west-to-east direction as in FIG. 8 is used. In this example, however, representative optical amplifiers 78 and 79, such as erbium-doped fiber amplifiers, typically used to maintain signal strength in WDM network fibers are also shown with a representative OADM 80. The OADM 80 is not necessarily the same architecture as the one shown in FIG. 8, and, in fact, is different for purposes of illustrating this aspect of the present invention.

In accordance with this embodiment, simple couplers 81 and 82 are connected to the optical fiber 70 for optional network expansion. The coupler 81 can split the signals on the optical fiber 70 and the coupler 82 can add signals to the optical fiber 70. When a wavelength router 83 is connected to the coupler 81, a set of signals from the optical fiber 70 can be selectively sent to optical fibers in new network directions to form a mesh. Likewise, a wavelength router 84 can be connected to the coupler 82 so that signals from the new network directions can be added to the optical fiber 70. The couplers 81 and 82, and wavelength routers 83 and 84 become part of the first level of the switching architecture of a node in a network mesh. There is no need to change the components of the OADM 80 for the west-to-east optical fiber 70 and that multiplexers and demultiplexers can be added for add/drop functions in the new network directions. Also, though only one optical fiber 70 is shown for the ring network, it is readily understood that the described embodiment also applies to other network optical fibers not shown for the ring network.

Figure 10:
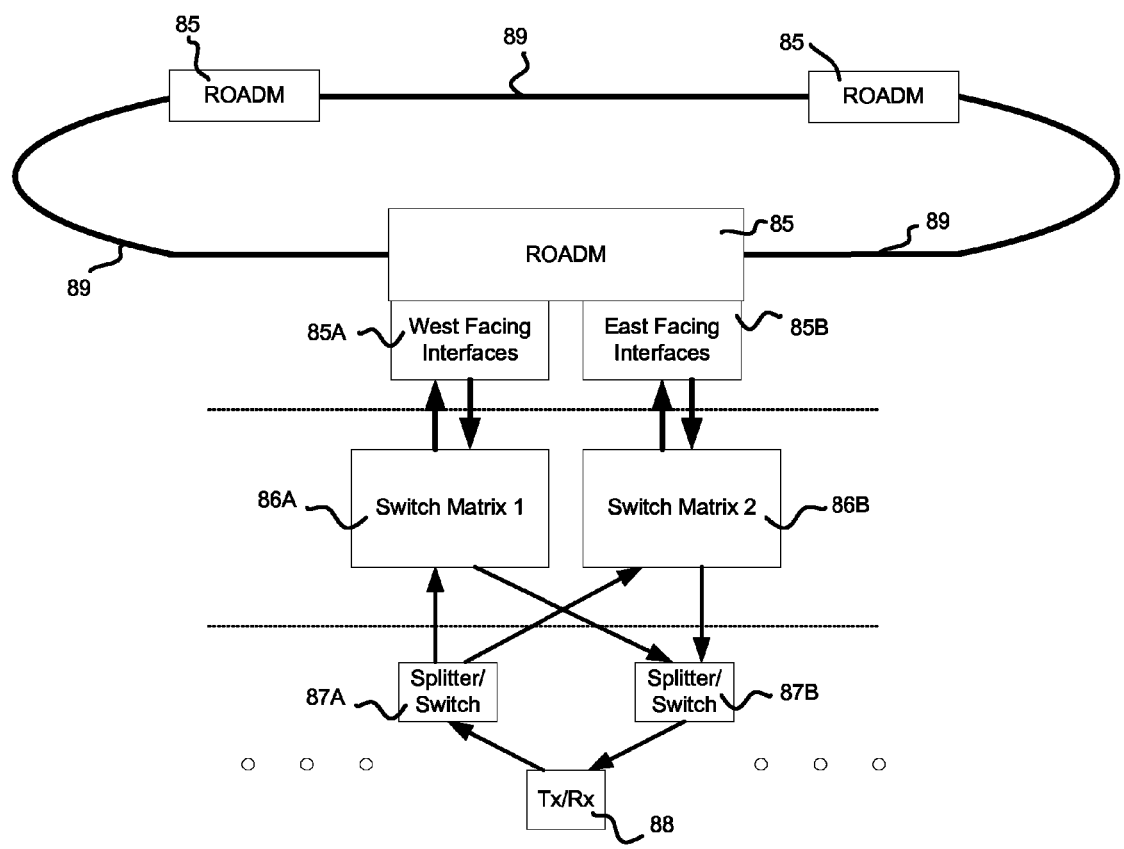
FIG. 10 shows a switching architecture for ring network nodes which permits easy implementation of protection mechanisms, according to another embodiment of the present invention.

FIG. 10 illustrates the adaptability of the present invention to the protection mechanisms, such as 1+1 and 1:1, found in optical networks. In this example, a heavily lined ring 89 indicates a plurality of optical fibers which typically form a ring network. The ring 89 has nodes with ROADMs (Reconfigurable Optical Add/Drop Multiplexers) 85 by which selected optical signals are added and/or dropped from the ring 89. With a node switching architecture according to the present invention, the network protection mechanisms are extended to the local port(s) to which the network signals are dropped or from which local signals are added.

The particular architecture of the ROADM 85 is not pertinent to this aspect of the present invention, but any ROADM has interfaces for each optical fiber in the ring 89: An example of an ROADM interface for one optical fiber are the input terminals to the wavelength-selective switch 77 and the output terminals of the demultiplexer 73 of the ROADM 80 illustrated in FIG. 9. With two optical fibers of the ring 89 in FIG. 10 termed as running in the east and west directions, the ROADM 85 has two interfaces 85A and 85B, one for each optical fiber. The ROADM 85 and its interfaces 85A and 85B are considered the first level of the node switching architecture as delineated by an upper dotted line running horizontally. Each of the interfaces 85A and 85B is connected to switch matrices 86A and 86B respectively. The two matrices 86A and 86B, which form the intermediate level of the architecture, are connected to a plurality of third level port units, one of which is shown in FIG. 10 and delineated by a lower dotted line running horizontally. The illustrated port unit has two splitter/switches 87A and 87B, and a transmitter/receiver unit 88 which has its transmitter portion connected to the splitter/switch 87A and its receiver portion connected to the splitter/switch 87B.

Operationally, local signals to be transmitted over the ring 89 are sent by the transmitter/receiver 88 to the splitter/switch 87A which, as a splitter under 1+1 protection, sends the signals to both switch matrices 86A and 86B. Under 1:1 protection, the splitter/switch 87A is a switch which selectively sends signals to either switch matrices 86A or 86B. The switch matrix 86A sends the signals to the west direction optical fiber of the ring 89 through the interface 85A and the switch/matrix 86B sends the signals to the east direction optical fiber of the ring 89 through the interface 85B.

Under 1+1 protection, signals received from the ring 89 pass through the interfaces 85A and 85B, the switch matrices 86A and 86B, and to the splitter/switch 87B which is a switch selecting which signals to send to the receiver portion of the unit 88. Under 1:1 protection, the signals from the ring 89 pass through either interface 85A and switch matrix 86A, or interface 85B and the switch matrix 86B, to the splitter/switch 87B which is a combiner (the inverse of a splitter) to provide a pathway for the signals to the receiver portion of the unit 88. Hence this architecture permits easy path protection mechanism.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A modular switching architecture for a node of a ring fiber optic network having optical fibers carrying wavelength division multiplexed (WDM) signals to and from said node in two directions, said modular switching architecture comprising:

a network level having a network coupler and a modular network wavelength router connected to an optical fiber of said fiber optic network configured to selectively pass WDM signals on said optical fiber through said node, said coupler splitting WDM signals for dropping selected WDM signals from said optical fiber, said modular network wavelength router adding selected WDM signals to said optical fiber;

an intermediate level having a plurality of modular add device units and modular drop device units, each add device unit comprising an amplifier and a second coupler, said amplifier amplifying signals from said second coupler and having an output port connected to said modular network wavelength router, said second coupler having a plurality of input ports comprising add device unit input ports so that said add device unit adds selected WDM signals to said optical fiber from said plurality of add device unit input ports through said modular network wavelength router and each modular drop device unit comprising a demultiplexer and a switch, said demultiplexer having an input port connected to said first coupler and a plurality of output ports, said switch having a plurality of input ports each connected to one of said first coupler output ports, and a plurality of output ports comprising drop device unit output ports so that said modular drop device unit drops selected WDM signals from said optical signals to said drop device unit output ports; and a local level having a plurality of modular port units, each modular port unit having a transmitter portion for converting electrical signals into optical signals and a receiver portion for converting optical signals into electrical signals, said transmitter portion connected to add device unit input ports and said receiver portion connected to drop device unit output ports so that optical signals converted from electrical signals to said modular port unit can be selectively sent from said node on said optical fiber and optical signals to said node on said optical fiber can be selectively received and converted by said modular port unit:

wherein said modular add device unit comprises:
  a multiplexer having an output port configured to be connected to said modular network wavelength router and which adds selected WDM signals to an optical fiber carrying WDM signals away from said node, and a plurality of input ports comprising said plurality of add device unit input ports; and
  a switched multiplexer having an output port configured to be connected in parallel with said multiplexer to said modular network wavelength router and which adds selected WDM signals to an optical fiber carrying WDM signals away from said node, and a plurality of input ports also comprising said plurality of add device unit input ports;

wherein said modular drop device unit further comprises:
  a switched demultiplexer having an input port configured to be connected in parallel with said demultiplexer to said modular network wavelength router and which drops selected WDM signals from an optical fiber carrying WDM signals to said node, and a plurality of output ports also comprising said plurality of drop device unit output ports.

2. The modular switching architecture of claim 1, wherein each of said plurality of modular port units further comprises a first switch having an input port connected to said transmitter portion and a plurality of output ports, each output port connected to an input port of each of said plurality of add device units; and a second switch having an output port connected to said receiver portion and a plurality of input ports, each input port connected to an output port of each of said plurality of drop device units.

3. The modular switching architecture for claim 2, wherein said transmitter portion of each modular port unit comprises a tunable laser so that wavelengths of said converted optical signals may be selected.

4. The modular switching architecture of claim 3, wherein said tunable laser is set to the same wavelength of signals received by said receiver portion of said modular port unit.

5. The modular switching architecture of claim 1, wherein said modular add device unit further comprises:
- a first wavelength router having an output port configured to be connected to said modular network wavelength router and which adds selected WDM signals to an optical fiber carrying WDM signals away from said node, and a plurality of input ports comprising said plurality of add device unit input ports; and
- wherein said modular drop device unit further comprises a second wavelength router having an input port configured to be connected to said modular network wavelength router and which drops selected WDM signals from an optical fiber carrying WDM signals to said node, and a plurality of output ports comprising said plurality of drop device unit output ports.

* * * * *